US011907818B2

(12) United States Patent
Oktay et al.

(10) Patent No.: US 11,907,818 B2
(45) Date of Patent: *Feb. 20, 2024

(54) COMPRESSION OF MACHINE-LEARNED MODELS VIA ENTROPY PENALIZED WEIGHT REPARAMETERIZATION

(71) Applicant: Google LLC, Mountain View, CA (US)

(72) Inventors: Deniz Oktay, Mountain View, CA (US); Saurabh Singh, Mountain View, CA (US); Johannes Balle, San Francisco, CA (US); Abhinav Shrivistava, Silver Springs, MD (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/165,211

(22) Filed: Feb. 6, 2023

(65) Prior Publication Data

US 2023/0186166 A1    Jun. 15, 2023

Related U.S. Application Data

(63) Continuation of application No. 15/931,016, filed on May 13, 2020, now Pat. No. 11,574,232.

(Continued)

(51) Int. Cl.
*G06N 20/00* (2019.01)
*G06N 3/08* (2023.01)

(52) U.S. Cl.
CPC ............... *G06N 20/00* (2019.01); *G06N 3/08* (2013.01)

(58) Field of Classification Search
CPC .................................. G06N 20/00; G06N 3/08
See application file for complete search history.

(56) References Cited

U.S. PATENT DOCUMENTS 11,574,232 B2 *   2/2023   Oktay ................... G06N 3/08
2018/0174050 A1 * 6/2018   Holt ..................... G06N 3/084
(Continued)

OTHER PUBLICATIONS

Balle et al., "End-To-End Optimized Image Compression", arXiv: 1611.01704v1, Nov. 5, 2016, 24 pages.
(Continued)

*Primary Examiner* — Kyu Chae
(74) *Attorney, Agent, or Firm* — Dority & Manning, P.A.

(57) ABSTRACT

Example aspects of the present disclosure are directed to systems and methods that learn a compressed representation of a machine-learned model (e.g., neural network) via representation of the model parameters within a reparameterization space during training of the model. In particular, the present disclosure describes an end-to-end model weight compression approach that employs a latent-variable data compression method. The model parameters (e.g., weights and biases) are represented in a "latent" or "reparameterization" space, amounting to a reparameterization. In some implementations, this space can be equipped with a learned probability model, which is used first to impose an entropy penalty on the parameter representation during training, and second to compress the representation using arithmetic coding after training. The proposed approach can thus maximize accuracy and model compressibility jointly, in an end-to-end fashion, with the rate-error trade-off specified by a hyperparameter.

20 Claims, 7 Drawing Sheets

Related U.S. Application Data

(60) Provisional application No. 62/848,523, filed on May 15, 2019.

(56) References Cited

U.S. PATENT DOCUMENTS

2018/0174275 A1* 6/2018 Bourdev .......... G06V 30/19173
2020/0304802 A1* 9/2020 Habibian ............... H04N 19/20

OTHER PUBLICATIONS

Balle et al., "Variational Image Compression with A Scale Hyperprior", arXiv:1802.01436v2, May 1, 2018, 23 pages.
Baskin et al., "UNIQ: Uniform Noise Injection for Non-Uniform Quantization of Neural Networks", arXiv:1804.10969v3, Oct. 2, 2018, 10 pages.
Bengio et al., "Estimating or Propagating Gradients through Stochastic Neurons for Conditional Computation", arXiv:1308.3432v1, Aug. 15, 2013, 12 pages.
Chen et al., "Compressing Convolutional Neural Networks in the Frequency Domain", 22nd ACM SIGKDD Conference on Knowledge Discovery and Data Mining, Aug. 13-17, 2016, San Francisco, California, United States, 10 pages.
Chen et al., "Compressing Neural Networks with the Hashing Trick", 32nd International Conference on Machine Learning, Jul. 6-11, 2015, Lille, France, 10 pages.
Courbariaux et al., "Binary Connect: Training Deep Neural Networks with Binary Weights During Propagations", Advances in Neural Information Processing Systems 28, vol. 1, Dec. 2015, 9 pages.
Cun et al., "Optimal Brain Damage", Advances in Neural Information Processing Systems 2, 1990, pp. 598-605.
Dubey et al., "Coreset-Based Neural Network Compression", 15th European Conference on Computer Vision, EECV 2018, Sep. 8-14, 2018, Munich, Germany, 17 pages.
Github.com, "TensorFlow Compression", https://github.com/tensorflow/tensorflow, retrieved on Mar. 25, 2021, 6 pages.
Gupta et al., "Deep Learning with Limited Numerical Precision", 32nd International Conference on Machine Learning, Jul. 6-11, 2015, Lille, France, 10 pages.
Han et al., "Deep Compression: Compressing Deep Neural Networks with Pruning, Trained Quantization and Huffman Coding", arXiv:1510.00149v3, Nov. 20, 2015, 13 pages.
Havasi et al., "Minimal Random Code Learning: Getting Bits Back from Compressed Model Parameters", arXiv:1810.00440v1, Sep. 30, 2018, 11 pages.
He et al., Deep Residual Learning for Image Recognition, 29th Institute of Electrical and Electronics Engineers Conference on Computer Vision and Pattern Recognition (CVPR), Jun. 26-Jul. 1, 2016, Las Vegas, Nevada, United States, pp. 770-778.
Huffman, "A Method for the Construction of Minimum-Redundancy Codes", Proceedings of the Institute of Radio Engineers, vol. 40, No. 9, Sep. 1952, pp. 1098-1101.
Ioffe et al., "Batch Normalization: Accelerating Deep Network Training by Reducing Internal Covariate Shift", arXiv:1502.03167v3, Mar. 2, 2015, 11 pages.
Kingma et al., "ADAM: A Method for Stochastic Optimization", arXiv:1412.6980v1, Dec. 22, 2014, 9 pages.
Krizhevsky, "Learning Multiple Layers of Features from Tiny Images", University of Toronto, Master's Thesis, Department of Computer Science, Apr. 8, 2009, 60 pages.
Lecun et al., "Gradient-Based Learning Applied to Document Recognition", Proceedings of the Institute of Electrical and Electronics Engineers, Nov. 1998, 46 pages.
Lecun et al., Yann.lecun.com, "The MNIST Database", http://yann.lecun.com/exdb/mnist/, retrieved on Jun. 24, 2020, 8 pages.
Li et al., "Pruning Filters for Efficient ConvNets", arXiv:1608.08710v2, Sep. 15, 2016, 9 pages.
Li et al., "Ternary weight networks", arXiv: 1605.04711v2, Nov. 19, 2016, 5 pages.
Louizos et al., "Bayesian Compression for Deep Learning", 31st Conference on Neural Information Processing Systems (NIPS 201), Dec. 4-9, 2017, Long Beach, CA, 11 pages.
Louizos et al., "Relaxed Quantization for Discretized Neural Networks", arXiv:1810.01875v1, Oct. 3, 2018, 14 pages.
Molchanov et al., "Variational Dropout Sparsifies Deep Neural Networks", arXiv:1701.05369v3, Jun. 13, 2017. 10 pages.
Rissanen et al., "Universal Modeling and Coding", Institute of Electrical and Electronics Engineers Transactions on Information Theory, vol. 27, No. 1, Jan. 1981, pp. 12-23.
Russakovsky et al., "ImageNet Large Scale Visual Recognition Challenge", arXiv:1409.0575v3, Jan. 30, 2018, 43 pages.
Shannon, "A Mathematical Theory of Communication", The Bell System Technical Journal, vol. 27, No. 3, 1948, 55 pages.
Simonyan et al., "Very Deep Convolutional Networks for Large-Scale Image Recognition", arXiv:1409.1556v6, Apr. 10, 2015, 14 pages.
Srinivas et al., "Data-free Parameter Pruning for Deep Neural Networks", arXiv:1507.06149, Jul. 22, 2015, 12 pages.
Theiss et al., "Lossy Image Compression with Compressive Autoencoders", arXiv:1703.00395v1, Mar. 1, 2017, 19 pages.
Ullrich et al., "Soft Weight-Sharing for Neural Network Compression", arXiv:1702.04008v2, May 9, 2017, 16 pages.
Wang et al., "CNNpack: Packing Convolutional Neural Networks in the Frequency Domain", Annual Conference on Advances in Neural Information Processing Systems 2016, Dec. 5-10, 2016, Barcelona, Spain, 9 pages.
Wiedemann et al., "DeepCABAC: Context-adaptive Binary Arithmetic Coding for Deep Neural Network Compression", arXiv:1905.08318v1, May 15, 2019, 4 pages.
Wiedemann et al., "Entropy-Constrained Training of Deep Neural Networks", arXiv:1812.07520v1, Dec. 18, 2018, 8 pages.
Zagoruyko et al., "Wide Residual Networks", 27th British Machine Vision Conference (BVMC), Sep. 19-22, 2016, York, United Kingdom, 12 pages.
Zhou et al., "Explicit Loss-Error-Aware Quantization for Low-Bit Deep Neural Networks", Institute of Electrical and Electronics Engineers Conference on Computer Vision and Pattern Recognition (CVPR), June 18-22, 2018, Salt Lake City, Utah, United States, 10 pages.

* cited by examiner

COMPRESSION OF MACHINE-LEARNED MODELS VIA ENTROPY PENALIZED WEIGHT REPARAMETERIZATION

RELATED APPLICATIONS

This application is a continuation of U.S. application Ser. No. 15/931,016 having a filing date of May 13, 2020, which claims priority to and the benefit of U.S. Provisional Patent Application 62/848,523. Applicant claims priority to and the benefit of each of such applications and incorporate all such applications herein by reference in its entirety.

FIELD

The present disclosure relates generally to machine learning. More particularly, the present disclosure relates to systems and methods that learn a highly compressible representation of a machine-learned model via representation of the model parameters within a reparameterization space during training of the model.

BACKGROUND

Artificial neural networks (referred to herein simply as "neural networks") and other forms of machine-learned models have proven to be highly successful on a variety of tasks, and as a result, there is an increasing interest in their practical deployment, including on low-memory or low-bandwidth devices, etc. However, machine-learned model parameters tend to require a large amount of storage space compared to manually designed algorithms. To make these models more practical, it is desirable to compress the model parameters, for example, in order to decrease storage/transmission requirements.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to perform machine learning. The method includes obtaining, by one or more computing devices, data descriptive of a machine-learned model that comprises a plurality of model parameters. The method includes defining, by the one or more computing devices, a plurality of reparameterized representations for the plurality of model parameters of the machine-learned model, wherein the plurality of reparameterized representations represent the plurality of model parameters in a reparameterization space. The method includes generating, by the one or more computing devices, one or more decoder models that are configured to transform the plurality of reparameterized representations into the plurality of model parameters of the machine-learned model. The method includes employing, by the one or more computing devices, the machine-learned model to generate a prediction based on a training input. The method includes evaluating, by the one or more computing devices, a loss function based on the prediction. The method includes modifying, by the one or more computing devices and based on the loss function, one or both of: the plurality of reparameterized representations and the one or more decoder models. The method includes, after modifying, by the one or more computing devices based on the loss function, one or both of: the plurality of reparameterized representations and the one or more decoder models: applying, by the one or more computing devices, one or more entropy coding compression techniques to the plurality of reparameterized representations to generate a compressed reparameterized representation of the machine-learned model.

Another example aspect of the present disclosure is directed to a computing device. The computing device is configured to receive data descriptive of a compressed reparameterized representation and one or more decoder models produced. The computing device is configured to reconstruct a plurality of model parameters of a machine-learned model from the compressed reparameterized representation through decompression and application of the one or more decoder models. The computing device is configured to employ, on the computing device, the plurality of model parameters of the machine-learned model to generate inferences.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
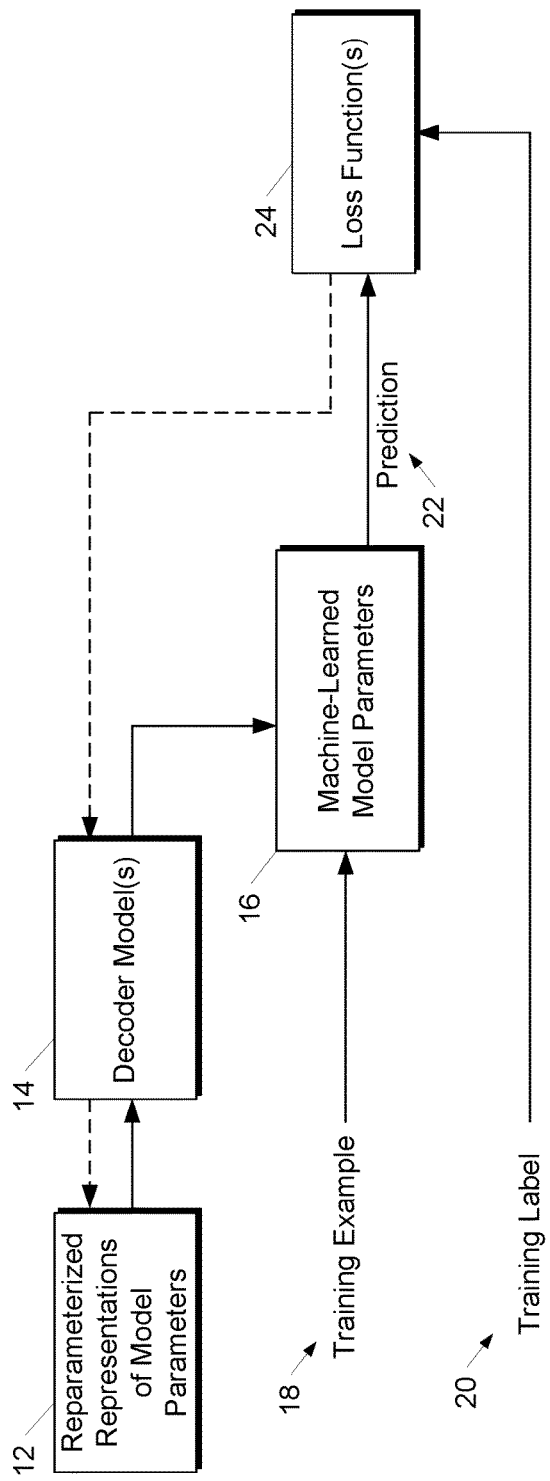
FIG. 1A depicts a block diagram of an example model training process according to example embodiments of the present disclosure.

Reference numerals that are repeated across plural figures are intended to identify the same features in various implementations.

DETAILED DESCRIPTION

1. Overview

Example aspects of the present disclosure are directed to systems and methods that learn a highly compressible representation of a machine-learned model (e.g., neural network) via representation of the model parameters within a reparameterization space during training of the model. In particular, the present disclosure describes an end-to-end model weight compression approach that employs a latent-variable data compression method. The model parameters (e.g., weights and biases) are represented in a "latent" or "reparameterization" space, amounting to a reparameterization. In some implementations, this space can be equipped with a learned probability model, which is used first to impose an entropy penalty on the parameter representation during training, and second to compress the representation using arithmetic coding after training. The proposed approach can thus maximize accuracy and model compressibility jointly, in an end-to-end fashion, with the rate-error trade-off specified by a hyperparameter.

More particularly, classic data compression in a Shannon sense requires discrete-valued data (i.e., the data can only take on a countable number of states) and a probability model on that data known to both sender and receiver. Practical compression algorithms are often lossy and consist of two steps. First, the data is subjected to (re)quantization. Then, a Shannon-style entropy coding method such as, for example, arithmetic coding is applied to the discrete values, bringing them into a binary representation which can be easily stored or transmitted. Shannon's source coding theorem establishes the entropy of the discrete representation as a lower bound on the average length of this binary sequence (the bit rate), and arithmetic coding achieves this bound asymptotically. Thus, entropy is an excellent proxy for the expected model size.

The type of quantization scheme affects both the fidelity of the representation (in this case, the precision of the model parameters, which in turn affects the prediction accuracy) as well as the bit rate, since a reduced number of states coincides with reduced entropy. Model parameters are typically represented as floating point numbers. While these technically have a finite (but large) number of states, the best results in terms of both accuracy and bit rate are typically achieved for a much reduced number of states. Existing approaches to model compression often acknowledge this by quantizing each individual linear filter coefficient in a model to a small number of pre-determined values This is often referred to as scalar quantization (SQ).

Other methods explore vector quantization (VQ), which is closely related to k-means clustering, in which each vector of filter coefficients is quantized jointly. This is equivalent to enumerating a finite set of representers (representable vectors). In contrast, in SQ the set of representers is given by the Kronecker product of representable scalar elements. VQ is much more general than SQ, in the sense that representers can be placed arbitrarily: if the set of useful filter vectors all live in a subset of the entire space, there is no benefit in having representers outside of that subset, which may be unavoidable with SQ. Thus, VQ has the potential to yield better results, but it also suffers from the "curse of dimensionality": the number of necessary states grows exponentially with the number of dimensions, making it computationally infeasible to perform VQ for much more than a handful of dimensions.

The systems and methods of the present disclosure leverage a key insight that the strengths of SQ and VQ can be combined by representing the data in a "latent" space. This space can be an arbitrary rescaling, rotation, or otherwise warping of the original data space. SQ in this space, while making quantization computationally feasible, can provide substantially more flexibility in the choice of representers compared to the SQ in the data space.

In particular, the present disclosure provides systems and methods that apply this technique to model compression, where it becomes equivalent to reparameterization: the model parameters are represented in a reparameterization space, which is discretized using SQ. A unique property of this problem setting is that only the mapping from this space to actual model parameters (kernels, biases) need ever be known, but not the inverse mapping. Therefore, certain implementations of the present disclosure need a "parameter decoder," which is generally denoted herein by f, but, in contrast to certain alternative approaches used in loss image/data compression, do not need a "parameter encoder."

The proposed techniques yield state-of-the-art model compression results. In particular, U.S. Provisional Patent Application 62/848,523, which is incorporated by reference into and forms a part of this specification, demonstrates example experimental results for example implementations of the present disclosure.

FIGS. 1A-D depict example block diagrams showing example aspects of the present disclosure. In particular, FIG. 1A depicts an example training process which results in learning of a plurality of reparameterized representations 12 of a plurality of model parameters 16 of a machine-learned model. More particularly, a computing system can obtain data descriptive of a machine-learned model that comprises a plurality of model parameters 16. For example, the machine-learned model can be a neural network. As examples, the model parameters 16 can include weight, biases, or other parameters of the model.

The computing system can define a plurality of reparameterized representations 12 for the plurality of model parameters 16 of the machine-learned model. In particular, the plurality of reparameterized representations 12 can represent the plurality of model parameters 16 in a reparameterization space (e.g., which can be discretized and equipped with an entropy penalty). In one example, one reparameterized representation 12 is defined for each model parameter 16.

According to an aspect of the present disclosure, the reparameterized representations 12 and corresponding reparameterization space can be designed such that the reparameterized representations 12 are amenable to one or more compression techniques which enable generation of a compressed representation of the model parameters 16 (specifically, a compressed representation of the reparameterized representations 12 of the model parameters 16).

The computing system can also define or otherwise generate one or more decoder models 14 that are configured to transform the plurality of reparameterized representations 12 into the plurality of model parameters 16 of the machine-learned model. The decoder models 14 can be of any level of complexity and can include linear functions (e.g., scalar affine transforms, scalar shift and scale functions, etc.) and/or non-linear functions. For example, in some implementations, the decoder models 14 can be neural networks (e.g., deep neural networks) or other non-linear models.

In some implementations, the model parameters 16 of the machine-learned model can be defined as a result of application of the decoder model(s) 14 to the reparameterized representations 12, such that determination of the model parameters 16 always flows from the underlying reparameterized representations 12.

According to another aspect of the present disclosure, in some implementations, the computing system can partition the plurality of model parameters 16 and the plurality of reparameterized representations 12 into a plurality of groups. For example, the plurality of model parameters can be partitioned into the plurality of groups based at least in part on a respective parameter type associated with each model parameter, such that parameters of the same type are included in the same group. As examples, parameter types can include the following types: convolutional, fully connected, bias, and/or other types.

More particularly, in some implementations, during the training process illustrated in FIG. 1A, each group of model parameters can be treated as samples from a respective learned distribution. Stated differently, a fully factorized distribution can be defined with parameter sharing within factors of the distribution that correspond to a same group of the plurality of groups. Thus, the reparameterized representations 12 can be interpreted as one or more matrices comprising one or more samples from one or more probability distributions. Design of the reparameterized representations 12 and corresponding reparameterization space in this fashion can enable substantial compression gains to be achieved through application of entropy coding techniques 26 as will be discussed with reference to FIG. 1B.

Referring still to FIG. 1A, in implementations in which the parameters are partitioned into a plurality of groups, the computing system can generate a plurality of decoder models 14 respectively associated with the plurality of groups. Each decoder model 14 can be configured to transform the plurality of reparameterized representations 12 included in a corresponding group into the plurality of model parameters 16 included in the corresponding group.

According to an aspect of the present disclosure, to jointly learn both the model parameters 16 and their corresponding reparameterized representations 12, the computing system can employ the machine-learned model with model parameters 16 to generate a prediction 22 based on a training input 18. In particular, the computing system can apply the decoder model(s) 14 to the reparameterized representations 12 to get the model parameters 16, and can then run the machine-learned model with the obtained parameters 16 to produce the prediction 22.

In some implementations, as illustrated in FIG. 1A, the training example 18 can be part of a supervised training pair that includes a ground truth training label 20. In other implementations, the training example 18 is an unsupervised training example that does not have a corresponding label 20. The prediction 22 can be any type of prediction, including a classification, an embedding, a detection, and/or any other type of prediction.

The computing system can evaluate a loss function 24 that evaluates the prediction 22 (e.g., in the supervised context, by comparing the prediction 22 to the training label 20). Generally, although a single training example 18 and prediction 22 is illustrated in FIG. 1A, training examples can be evaluated at the loss function 24 in batches. The loss function 24 can provide a loss value based on the prediction 22.

In some implementations, the loss function 24 can include a loss term that provides a loss value that is positively correlated to an entropy associated with the plurality of reparameterized representations 12. For example, the loss term can provide a loss value that is positively correlated to a self-information of the plurality of reparameterized representations 12 over one or more probability distributions. Penalizing the entropy of the reparameterized representations 12 in such fashion, can enable reparameterized representations 12 to be learned which provide optimal compression gains when an entropy coding compression technique is applied, as will be discussed with reference to FIG. 1B.

Referring still to FIG. 1A, according to an aspect of the present disclosure, to jointly learn both the model parameters 16 and their corresponding reparameterized representations 12, the computing system can modify one or both of: the plurality of reparameterized representations 12 and the one or more decoder models 14. In particular, as one example illustrated by the dashed lines in FIG. 1A, the computing system can backpropagate the loss function 24 through the one or more decoder functions 14 with or without modification of the one or more decoder functions 14 and then continue to backpropagate the loss function 24 through the plurality of reparameterized representations 12 with modification of the plurality of reparameterized representations 12. As one example, the computing system can perform a gradient descent technique in which parameters of the models 14 or the reparameterized representations 12 can be modified in a direction of a negative gradient of the loss function.

In some implementations in which the reparameterized representations 12 are modeled using one or more probability distributions, the probability distributions can be estimated using one or more non-parametric continuous density functions to obtain estimates of the loss function 24 and its gradient. Similarly, in some implementations in which quantization is applied to the reparameterized representations 12, to avoid challenges associated with non-differentiability introduced through such quantization, the computing system can maintain and modify during the training process a plurality of continuous surrogates of the reparameterized representations. After training, the computing system can round each of the plurality of continuous surrogates to a respective nearest quantization value to obtain a plurality of final reparameterized representations. For example, in some implementations, quantization can be performed to round each reparameterized representations to a nearest integer.

Figure 1B:
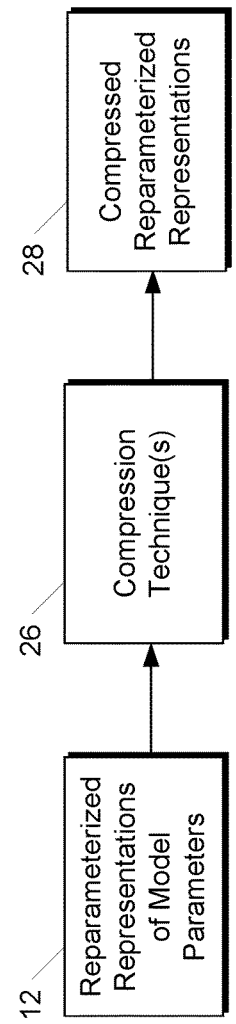
FIG. 1B depicts a block diagram of an example compression process according to example embodiments of the present disclosure.

FIG. 1B depicts a block diagram of an example compression process. In particular, following the training process performed in FIG. 1A, the computing system can apply one or more compression techniques 26 to the reparameterized representations 12 of the model parameters. As examples, the compression techniques 26 can include one or more entropy coding or Shannon-style techniques such as arithmetic coding and/or Huffman coding. Other compression techniques (e.g., lossless compression techniques) can be applied as well. Performance of the compression techniques 26 can result in generation of compressed reparameterized representations 28.

Figure 1C:
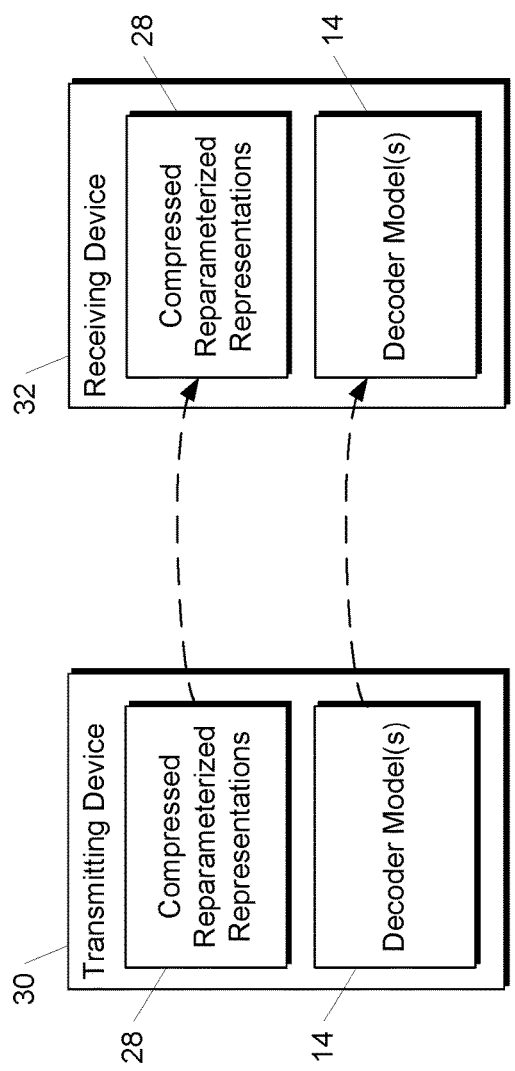
FIG. 1C depicts a block diagram of an example data transmission process according to example embodiments of the present disclosure.

FIG. 1C depicts an example transmission process. In particular, a transmitting device 30 (e.g., a server computing system) can transmit the compressed reparameterized representations 28 and decoder model(s) 14 to a receiving device 32 (e.g., a user computing device such as an edge device such as a laptop, smartphone, embedded device, smart device, IoT device, in-vehicle computing device, gaming console, etc.). In general, the compressed reparameterized representations 28 and decoder model(s) 14 together can have a significantly smaller data size and relative to the raw model parameters 16 themselves. Thus, the systems and methods of the present disclosure enable, as illustrated in FIG. 1C, transmission of machine-learned models with reduced bandwidth requirements. In addition, the compressed reparameterized representations 28 and decoder model(s) 14 can be stored at the receiving device 32 using far fewer memory requirements.

Figure 1D:
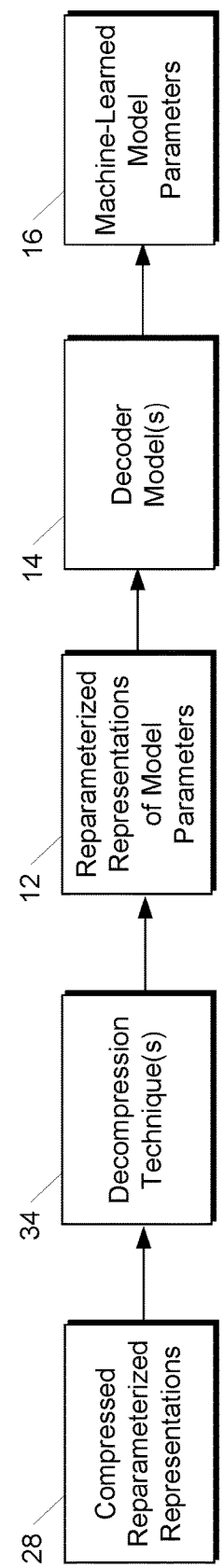
FIG. 1D depicts a block diagram of an example process to generate machine-learned model parameters from a compressed representation.

FIG. 1D shows an example process to generate machine-learned model parameters from a compressed representation. As one example, the process illustrated in FIG. 1D can be performed by the receiving device 32.

As illustrated in FIG. 1D, a computing system can apply one or more decompression techniques 34 to transform the compressed reparameterized representations 28 into the reparameterized representations 12 of the model parameters. For example, the decompression techniques 34 can be inverse operations to the compression techniques 26 of FIG. 1B (e.g., inverse entropy coding techniques).

Referring still to FIG. 1D, the computing system can apply the one or more decoder models 14 to transform the reparameterized representations 12 into the model parameters 16 of the machine-learned model. Thereafter, the computing system (e.g., the receiving device 32) can employ the model with parameters 16 to produce inferences. In particular, in some implementations, the decoder models 14 can be applied in real-time as part of running the model to produce inferences (e.g., the decoded parameters 16 are not stored in disk and are generated in real-time for each inference).

Thus, the systems and methods of the present disclosure provide a number of technical effects and benefits. As one example technical effect, the systems and methods of the present disclosure learn a highly compressible representation of a machine-learned model via representation of the model parameters within a reparameterization space during training of the model. The reparameterized representation can be compressed using entropy coding compression techniques to generate a compressed reparameterized representation of the machine-learned model that has a much smaller datasize than the uncompressed version of the machine-learned model. Thus, transmission of the compressed reparameterized representation of the machine-learned model (e.g., from a powerful machine learning system to an edge device over a network (e.g., the Internet)) can require much less network bandwidth and usage of transmission resources (e.g., network interfaces, ports, data usage, and/or the like).

As another example technical effect and benefit, in some implementations, the compressed reparameterized representation or uncompressed reparameterized representation can be stored in a memory of a device (e.g., an edge device such as a user computing device such as a smartphone). Then, when it is desired to perform inference with the machine-learned model, the reparameterized representation can be decompressed and/or decoded to obtain the model parameters of the machine-learned model to be used to perform inference. Thus, only the compressed reparameterized representation or uncompressed reparameterized representation—which has a much smaller datasize than the raw model parameters—is required to be stored by the device, thereby reducing memory usage or storage requirements associated with the machine-learned model.

2. Example Implementations of Entropy Penalized Reparameterization

This section provides example implementations of the entropy penalized reparameterization approaches of the present disclosure. However, the proposed approaches are not limited to these specific example implementations. Further, although certain example implementations will be described in the context of and relative to a model configured to perform a classification task, the proposed systems and methods are not limited to classification but can be applied to any different machine-learning problem, including both supervised and unsupervised approaches.

However, to provide a framework for certain examples, consider a classification setup, where a dataset $D=\{(x_1, y_1), \ldots (x_N, y_N)\}$ consisting of pairs of examples $x_i$ and corresponding labels $y_i$ is given. An objective is to minimize the expected negative log-likelihood on D, or cross-entropy classification loss, over the set of model parameters $\Theta$:

$$\Theta^* = \arg\min_\Theta \mathbb{E}_{(x,y) \sim D}[-\log p(y|x;\Theta)] \quad (1)$$

where $p(y|x; \Theta)$ is the likelihood the model assigns to a dataset sample (x, y). The likelihood function can be implemented using a machine-learned model (e.g., neural network) with parameters $\Theta=\{\theta_{1,w}, \theta_{1,b}, \theta_{2,2}, \theta_{2,b}, \ldots, \theta_{N,W}\}$, where $\theta_{k,w}$ and $\theta_{k,b}$ denote the weight (including convolutional) and bias terms at layer k, respectively.

Compressing the model amounts to compressing each parameter in the set $\Theta$. Instead of compressing each parameter directly, aspects of the present disclosure propose to compress reparameterized forms of them. To provide one example, the reparameterizations $\Phi=\{\varphi_{1,w}, \varphi_{1,b}, \varphi_{2,w}, \varphi_{2,b}, \ldots, \varphi_{N,W}\}$ and parameter decoders $f_{conv}, f_{dense}, f_{bias}$ can be introduced such that $$\theta_{k,W} = f_{conv}(\varphi_{k,W}) \text{ if layer k is convolutional} \quad (2)$$

$$\theta_{k,W} = f_{dense}(\varphi_{k,W}) \text{ if layer k is fully connected} \quad (3)$$

$$\theta_{k,b} = f_{bias}(\varphi_{k,b}) \text{ if layer k has a bias} \quad (4)$$

Each parameter decoder f can be thought of as a mapping from reparameterization space (R-space) to parameter space (P-space). For each of notation, $\mathcal{F} = \{f_{conv}, f_{dense}, f_{bias}\}$ and $\Theta = \mathcal{F}(\Phi)$. In some implementations, the parameter decoders themselves have learnable parameters, which are denoted W. Example implementations of the proposed method are visually summarized in FIGS. 2 and 3.

Figure 2:
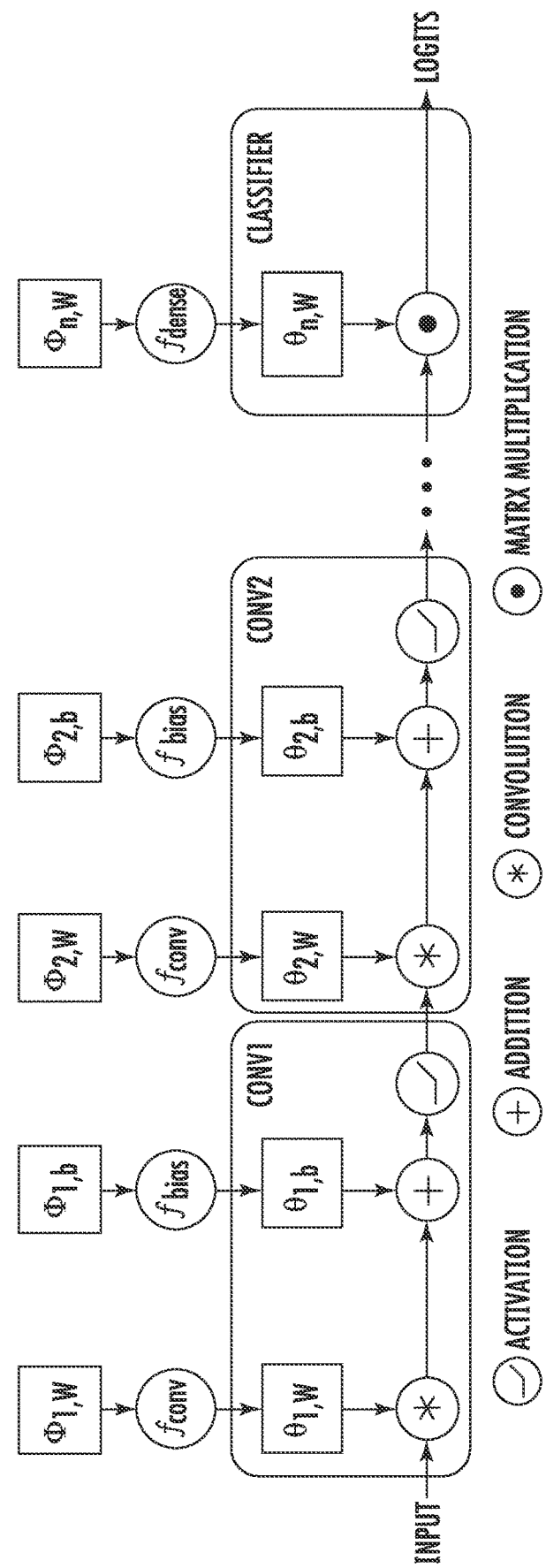
FIG. 2 depicts a graphical diagram of a pipeline during inference according to example embodiments of the present disclosure.

In particular, FIG. 2 illustrates an example visualization of an example pipeline during inference. The $\Psi$ tensors can be stored in their compressed form. They can then be read from storage, uncompressed, and transformed via f into $\theta$, which are then used as parameters in standard convolutional or dense layers. In some implementations, when uncompressed, $\varphi$ are (e.g., integer) quantized tensors.

Figure 3:
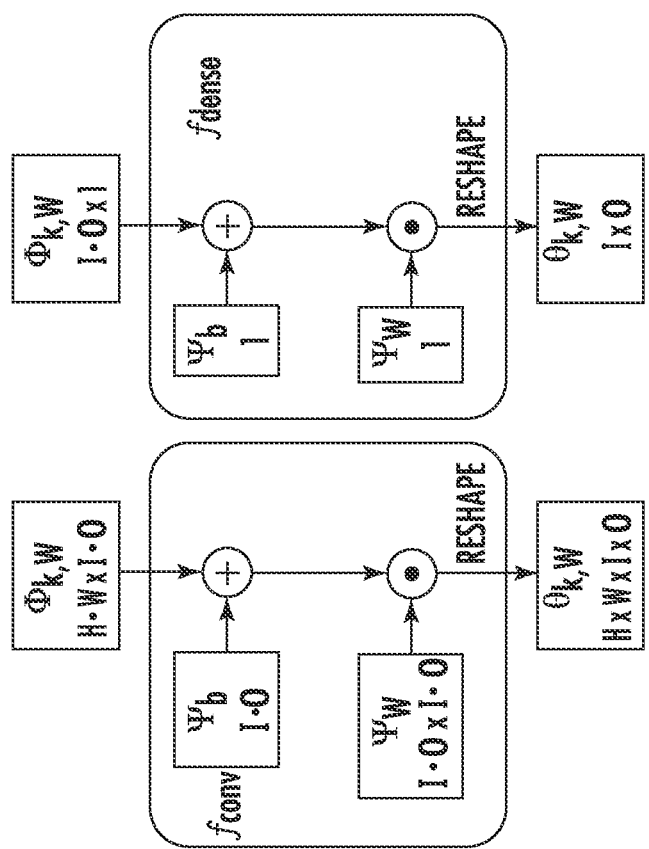
FIG. 3 depicts a graphical diagram of an example intervals for decoder models according to example embodiments of the present disclosure.

FIG. 3 illustrates example internals of $f_{conv}$ and $f_{dense}$ in example experiments for layer k. In the $f_{conv}$ visualization, H, W, I, O refer to the convolutional height, width, input channel, and output channel, respectively. For the $f_{dense}$ visualization, I, O refer to the number of input and output neurons. For $f_{conv}$, as one example, an affine transform can be used, while for $f_{dense}$, as another example, a scalar shift and scale can be used. These examples have been found to be sufficiently expressive to get state of the art compression. Note also that in both cases, the number of parameters in $\Psi$ is significantly smaller compared to the size of the corresponding $\varphi$. Therefore $\Psi$ does not lead to significant model storage overhead.

2.1 Example Model Partitioning

In some implementations, the proposed systems and methods can employ a partitioning scheme in which the set of model parameters are partitioned into groups. For example, for the purpose of creating a model compression method, entire groups of model parameters can be interpreted as samples from the same learned distribution. A fully factorized distribution $q(\Phi) = \prod_{\varphi \in \Phi} q_\varphi(\varphi)$ can be defined, and parameter sharing within the factors $q_\varphi$ of the distribution that correspond to the same group can be introduced, as well as within the corresponding decoders. These group assignments can be fixed a priori. For instance, in FIG. 2, $\theta_{1,W}$ and $\theta_{2,W}$ can be assumed to be samples of the same distribution, that is $q_{\Phi1,W}(\cdot)=q_{\varphi2,W}(\cdot)$. The same parameter decoder $f_{conv}$ can also be used to decode them. Further, in some implementations, each of the reparameterizations φ can be defined as a rank-2 tensor (a matrix), where each row corresponds to a "sample" from the learned distribution. The operations in f can apply the same transformation to each row (see, e.g., FIG. 2). As an example, in $f_{conv}$, each spatial H×W matrix of filter coefficients can be assumed to be a sample from the same distribution. Benefits of this approach are described in section 2.2. The proposed approach can be applied analogously to various model partitionings. In fact, in the example experiments contained in U.S. Provisional Patent Application 62/848,523, the size of the groups, i.e., the number of parameters assumed i.i.d., depending on the total number of parameters of the model (Θ), is varied. The size of the groups parameterizes a trade-off between compressibility and overhead: if groups consisted of just one scalar parameter each, compressibility would be maximal, since q would degenerate (i.e., would capture the value of the parameter with certainty). However, the overhead would be maximal, since $\mathcal{F}$ and q would have a large number of parameters that would need to be included in the model size (defeating the purpose of compression). On the other hand, encoding all parameters of the model with one and the same decoder and scalar distribution would minimize overhead, but may be overly restrictive by failing to capture distributional differences amongst all the parameters, and hence lead to suboptimal compressibility.

2.2 Example Techniques to Compress Φ with Shannon Coding

In order to apply a Shannon-style entropy coder efficiently to the reparameterizations Φ, a discrete alphabet of representers and associated probabilities for each representer can be established. Rather than handling an expressive set of representers, as in VQ, certain implementations of the present disclosure choose to fix them to the integers, and achieve expressivity via the parameter decoders $\mathcal{F}$ instead. However, in other implementations, the representers can be expressive and learned.

In some implementations, each $\varphi \in \mathbb{Z}^{d \times \ell}$ is a matrix interpreted as consisting of d samples from a discrete probability distribution producing vectors of dimension $\ell$. A factorized probability model $$q(\phi) = \prod_{j=1}^{d}\prod_{i=1}^{\ell} q_i(\phi_{j,i}) \qquad (5)$$

can be fit to each column i of φ, using $\ell$ different probability models $q_i$ for each corresponding parameter decoder (the form of $q_i$ is described in the next section). Fitting of probability models can be done by minimizing the negative log-likelihood. Assuming φ follows the distribution q, Shannon's source coding theorem states that the minimal length of a bit sequence encoding φ is the self-information of φ under q:

$$I(\varphi)=\log_2 q(\varphi) \qquad (6)$$

which is identical to Shannon cross entropy up to an expectation operator, and identical to the negative log likelihood up to a constant. By minimizing I over q and φ during training, two goals can be simultaneously achieved: q is fit to the model parameters in a maximum likelihood sense, and the parameters are also directly optimized for compressibility.

After training, an arithmetic code can be designed for q, and can be used to compress the model parameters. This method incurs only a small overhead over the theoretical bound due to the finite length of the bit sequence (the optimality of arithmetic coding holds asymptotically). Practically, the overhead amounts to less than 1% of the size of the bit sequence; thus, self-information is an excellent proxy for model size. Further overhead results from inclusion of a description of Ψ, the parameters of the parameter decoders, as well as of q itself (e.g., in the form of a table) in the model size. However, these can be considered constant and small compared to the total model size, and thus do not need to be explicitly optimized for.

In some implementations, the overall loss function can be the additive combination of the original cross-entropy classification loss under reparameterization with the self-information of all reparameterizations:

$$L(\Phi, \Psi) = \mathbb{E}_{(x,y)\sim D}[-\log p(y \mid x; \mathcal{F}(\Phi))] + \lambda \sum_{\phi \in \Phi} I(\phi) \qquad (7)$$

The second term (excluding the constant λ) can be referred to as the rate loss. By varying λ across different experiments, the Pareto frontier of compressed model size vs. model accuracy can be explored. To compare the proposed methods to other work, λ was varied such that the method produced similar accuracy, and then compared the resulting model size.

2.3 Example Discrete Optimization

Since Φ is discrete-valued, some further approximations may be required in order to optimize L over it using stochastic gradient descent. To get around this, continuous surrogates $\hat{\Phi}$ can be maintained.

For optimizing the classification loss, the "straight-through" gradient estimator (See, Bengio et al. (2013)) can be used, which provides a biased gradient estimate but has shown good results in practice. This can include rounding the continuous surrogate to the nearest integer during training, and ignoring the rounding for purposes of backpropagation. After training, only the discretized values are kept.

Furthermore, in order to obtain good estimates for both the rate term and its gradient during training, a relaxation approach can be adopted, such as is described in Balle et al., Variational image compression with a scale hyperprior. arXiv preprint arXiv:1802.01436, 2018. The relaxation approach can replace the probability mass functions $q_i$ with a set of non-parametric continuous density functions, which are, for example, based on small neural networks. These density models are fitted to $\hat{\varphi}_{j,i}+n_{j,i}$, where $$n_{j,i} \sim \mathcal{U}\left(-\frac{1}{2}, \frac{1}{2}\right)$$

is i.i.d. uniformly distributed additive noise. This turns out to work well in practice, because the negative log likelihood of these noise-affected variates under the continuous densities approximates the self-information I:

$$I(\phi) \approx \sum_{j=1}^{d}\sum_{i=1}^{\ell} -\log_2 \tilde{q}_i(\phi_{j,i} + n_{j,i}) \qquad (8)$$

where $\tilde{q}_i$ denote the density functions. Once the density models are trained, the values of the probability mass functions modeling $\varphi$ can be derived from the substitutes $\tilde{q}_i$ and stored in a table, which can be included in the model description. The parameters of $\tilde{q}_i$ are no longer needed after training.

3. Example Devices and Systems

Figure 4A:
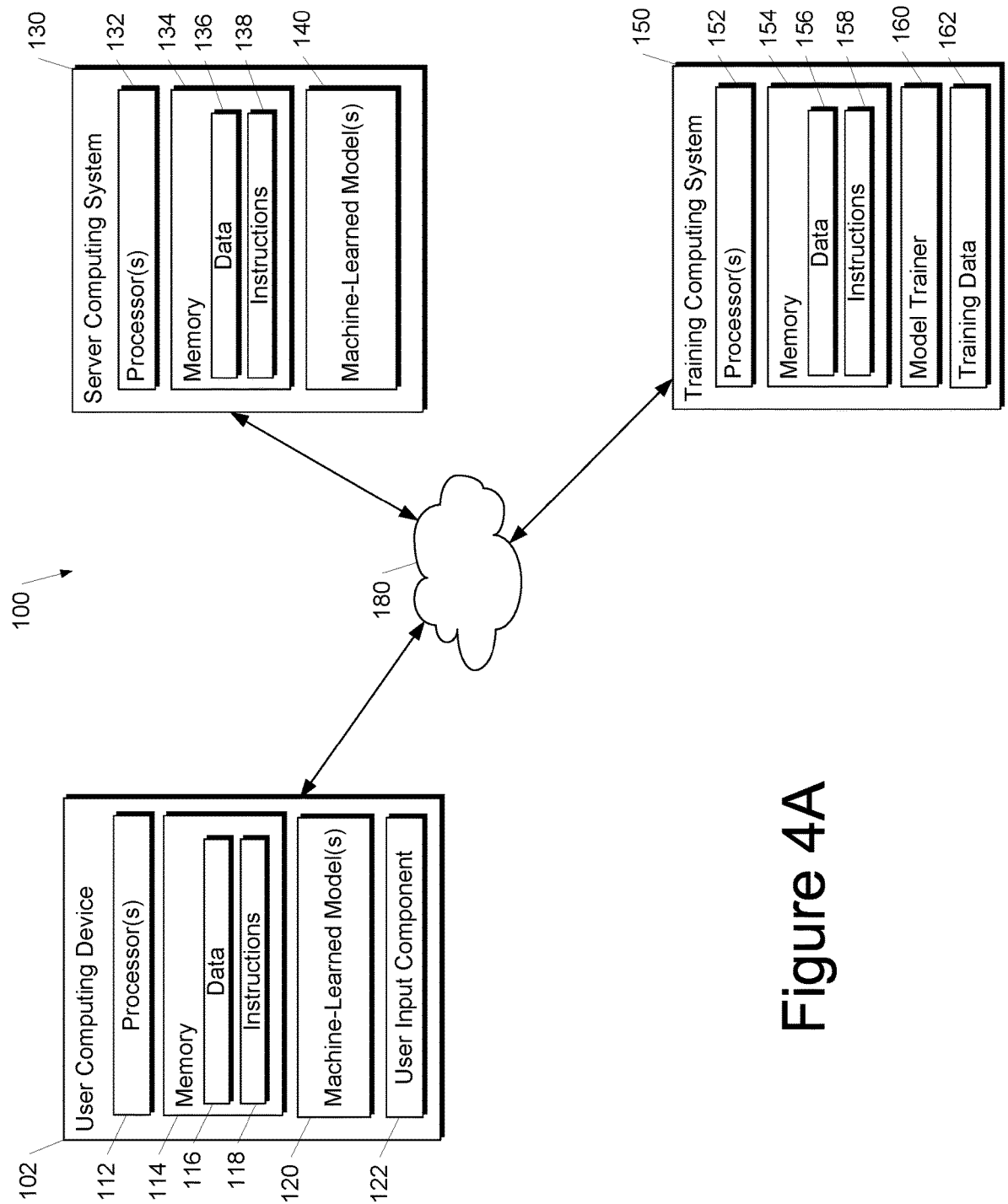
FIG. 4A depicts a block diagram of an example computing system according to example embodiments of the present disclosure.

FIG. 4A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned models 120 are discussed with reference to FIGS. 1-D, 2, and 3. In particular, in some examples, the machine-learned models 120 can be stored as compressed reparameterized representations and a set of one or more decoder models.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 1A-D, 2, and 3. In particular, in some examples, the machine-learned models 140 can be stored as compressed reparameterized representations and a set of one or more decoder models.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, supervised data and/or unsupervised data.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 4A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 4B:
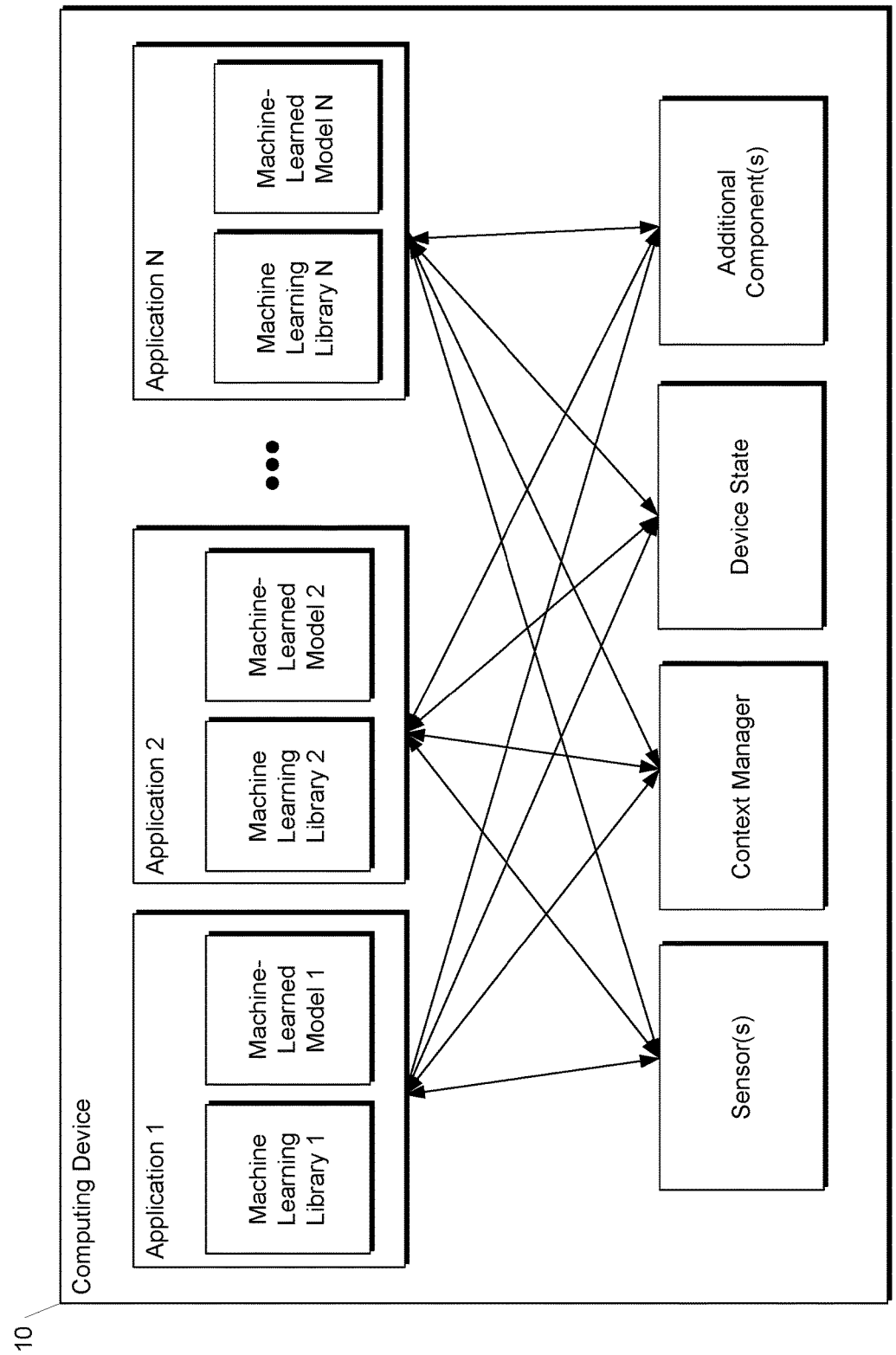
FIGS. 4B and 4C depict block diagrams of example computing devices according to example embodiments of the present disclosure.

FIG. 4B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 4B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 4C:
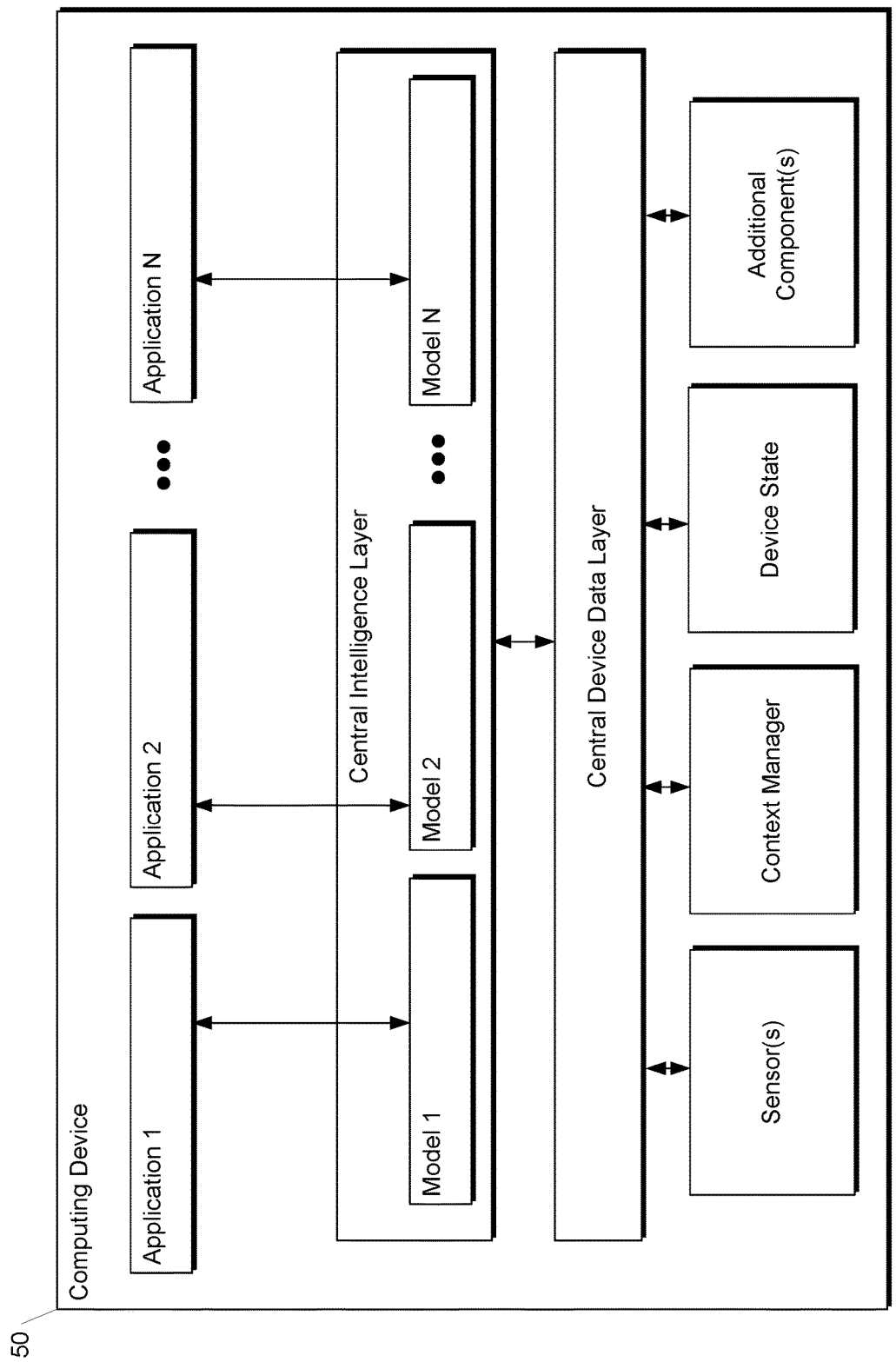

FIG. 4C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 4C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 4C, the central device data layer can communicate with a number of other components of the computing device, such as, for example, one or more sensors, a context manager, a device state component, and/or additional components. In some implementations, the central device data layer can communicate with each device component using an API (e.g., a private API).

4. Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to learn a compressed representation of a machine-learned model via a representation within a reparameterization space, the method comprising:
employing, by the one or more computing devices, the machine-learned model to generate a prediction based on a training input, wherein an uncompressed representation of the machine-learned model is characterized by a plurality of model parameters that are representable, within the reparameterization space, by a plurality of reparametrized representations;
modifying, by the one or more computing devices, at least one data element of a set of data elements based on an evaluation of a loss function that is a function of the prediction, wherein the set of data elements includes at least the plurality of parameterized representations and one or more decoder models that are configured to transform the plurality of reparametrized representations into the plurality of model parameters;
after modifying the at least one data element, generating, by the one or more computing devices, the compressed reparametrized representation of the machine-learned model based on applying one or more entropy coding compression techniques to the plurality of reparametrized representations.

2. The computer-implemented method of claim 1 further comprising:
obtaining, by one or more computing devices, data descriptive of the plurality of model parameters;
defining, by the one or more computing devices, the plurality of reparametrized representations for the plurality of model parameters of the machine-learned model; and
generating, by the one or more computing devices, the one or more decoder models.

3. The computer-implemented method of claim 1, wherein modifying the at least one data element comprises:
modifying, by the one or more computing devices, at least one of the plurality of reparametrized representations based on the evaluation of the loss function.

4. The computer-implemented method of claim 1, wherein modifying the at least one data element comprises:
modifying, by the one or more computing devices, at least one of the one or more decoder models based on the evaluation of the loss function.

5. The computer-implemented method of claim 1, wherein modifying the at least one data element comprises
backpropagating, by the one or more computing devices, the evaluation of the loss function through the one or more decoder models with modification of the one or more decoder models; and
after backpropagating, by the one or more computing devices, the evaluation of the loss function through the one or more decoder models, continuing to backpropagate, by the one or more computing devices, the evaluation of the loss function through the plurality of reparametrized representations with modification of the plurality of reparametrized representations.

6. The computer-implemented method of claim 1, further comprising:
transmitting, by the one or more computing devices, data descriptive of the compressed reparametrized representation and the one or more decoder models to an edge device that is configured to reconstruct the plurality of model parameters from the compressed reparametrized representation through decompression and employment of the one or more decoder models.

7. The computer-implemented method of claim 1, further comprising:
partitioning, by the one or more computing devices, the plurality of model parameters and the plurality of reparametrized representations into a plurality of groups.

8. The computer-implemented method of claim 7, further comprises:
generating, by the one or more computing devices, a plurality of decoder models respectively associated with the plurality of groups, wherein the plurality of decoder models includes the one or more decoder models and each decoder model of the plurality of decoder models is configured to transform the plurality of reparametrized representations included in a corresponding group into the plurality of model parameters included in the corresponding group.

9. The computer-implemented method of claim 7, wherein partitioning the plurality of model parameters and the plurality of reparametrized representations into the plurality of groups comprises:
partitioning, by the one or more computing devices, the plurality of model parameters into the plurality of groups based at least in part on a respective parameter type associated with each model parameter, wherein at least some of the respective parameter types comprise the following types:
convolutional, fully connected, and bias.

10. The computer-implemented method of claim 7, wherein each group of model parameters is treated as samples from a respective learned distribution.

11. The computer-implemented method of claim 7, further comprising:
defining, by the one or more computing devices, the plurality of reparametrized representations based on a fully factorized distribution with parameter sharing within factors of the distribution that correspond to a same group of the plurality of groups.

12. The computer-implemented method of claim 1, wherein the loss function comprises a loss term that provides a loss value that is positively correlated to an entropy associated with the plurality of reparametrized representations.

13. The computer-implemented method of claim 1, wherein the loss function comprises a loss term that provides a loss value that is positively correlated to a self-information of the plurality of reparametrized representations over one or more probability distributions.

14. The computer-implemented method of claim 13, wherein the one or more probability distributions are estimated using one or more non-parametric continuous density functions.

15. The computer-implemented method of claim 1, further comprising:

maintaining, by the one or more computing devices, a plurality of continuous surrogates of the reparametrized representations; and modifying, by the one or more computing devices based on the loss function, the plurality of continuous surrogates of the reparametrized representations;

after modifying the plurality of continuous surrogates, rounding, by the one or more computing devices, each of the plurality of continuous surrogates to a respective nearest quantization value to obtain a plurality of final reparametrized representations.

16. The computer-implemented method of claim 15, wherein rounding each of the plurality of continuous surrogates to the respective nearest quantization value comprises:

rounding, by the one or more computing devices, each of the plurality of continuous surrogates to a respective nearest integer.

17. The computer-implemented method of claim 1, wherein the one or more decoder models comprise one or more linear functions.

18. The computer-implemented method of claim 1, wherein the one or more decoder models comprise one or more non-linear functions.

19. One or more non-transitory computer-readable media that store instructions that, when executed by one or more computing devices, cause the one or more computing devices to perform operations for learning a compressed representation of a machine-learned model via a representation within a reparameterization space, the operations comprising:

employing the machine-learned model to generate a prediction based on a training input, wherein an uncompressed representation of the machine-learned model is characterized by a plurality of model parameters that are representable, within the reparameterization space, by a plurality of reparametrized representations;

modifying at least one data element of a set of data elements based on an evaluation of a loss function that is a function of the prediction, wherein the set of data elements includes at least the plurality of parameterized representations and one or more decoder models that are configured to transform the plurality of reparametrized representations into the plurality of model parameters;

after modifying the at least one data element, generating the compressed reparametrized representation of the machine-learned model based on applying one or more entropy coding compression techniques to the plurality of reparametrized representations.

20. A computing device comprising:

one or more processors; and one or more non-transitory computer-readable media that store instructions that, when the instructions are executed by the one or more processors, cause the computer system to perform operations to learn a compressed representation of a machine-learned model via a representation within a reparameterization space, the operations comprising:

employing, by the one or more computing devices, the machine-learned model to generate a prediction based on a training input, wherein an uncompressed representation of the machine-learned model is characterized by a plurality of model parameters that are representable, within the reparameterization space, by a plurality of reparametrized representations;

modifying, by the one or more computing devices, at least one data element of a set of data elements based on an evaluation of a loss function that is a function of the prediction, wherein the set of data elements includes at least the plurality of parameterized representations and one or more decoder models that are configured to transform the plurality of reparametrized representations into the plurality of model parameters;

after modifying the at least one data element, generating, by the one or more computing devices, the compressed reparametrized representation of the machine-learned model based on applying one or more entropy coding compression techniques to the plurality of reparametrized representations.

* * * * *